United States Patent [19]
Reinicke

[11] Patent Number: 5,318,064
[45] Date of Patent: Jun. 7, 1994

[54] MOTOR-OPERATED VALVE

[75] Inventor: Robert H. Reinicke, Mission Viejo, Calif.

[73] Assignee: Marotta Scientific Controls, Inc., Montville, N.J.

[21] Appl. No.: 127,271

[22] Filed: Sep. 24, 1993

[51] Int. Cl.⁵ .............................................. F16K 31/04
[52] U.S. Cl. ............................ 137/487.5; 251/129.11
[58] Field of Search ................... 137/487.5; 251/129.11

[56] References Cited

U.S. PATENT DOCUMENTS

| 2,824,460 | 2/1958 | Davis | 251/129.11 X |
| 4,948,091 | 8/1990 | Satoh | 251/129.11 X |

Primary Examiner—Robert G. Nilson
Attorney, Agent, or Firm—Hopgood, Calimafde, Kalil, Blaustein & Judlowe

[57] ABSTRACT

A valve construction wherein the rotor shaft of a reversible electric motor is axially displaceable between axially spaced elements of a differential-screw system for driven displacement of a valve member. Each of these spaced elements is preferably a ball screw, independently co-operative with upper and lower regions of the rotor shaft, i.e., at the respective upper and lower sides of the rotor carried by the shaft. The valve of the invention and its control and drive system are contained within a housing which fixedly mounts (a) the ball-screw nut of the upper element of the differential-screw system and (b) the stator of the motor, so that motor-driven rotation results in axial displacement of the rotor and its shaft, pursuant to the helical advance lead or pitch of the upper ball-screw nut. The ball-screw nut of the lower element of the differential-screw system is (a) engaged to the shaft and (b) axially displaceable yet effectively keyed against rotation with respect to the housing; and this lower ball-screw nut is adapted to provide axial displacement control of a poppet-valve member with respect to its coacting seat, in a valve-body passage between inlet and outlet ports of the valve. Great mechanical advantage is achieved for relatively low motor-torque delivery, when the helical leads (or pitches) of the respective ball screws are in the same direction but are slightly different.

15 Claims, 3 Drawing Sheets

MOTOR-OPERATED VALVE

BACKGROUND OF THE INVENTION

The invention relates to a valve construction and mode of operation for controlling the flow of a pressure fluid from an upstream source of high pressure supply to an outlet for downstream storage or utilization at reduced pressure. The invention has illustrative application as a regulating valve, wherein the upstream supply pressure is, at least initially, in the order of 10,000 psi, and wherein a relatively small-volume tank is to be loaded with smoothly ramped increasing pressure to a set point in the order of 800 psi, the valve being automatically modulated as needed to maintain tank ullage pressure in an operating band of ±50 psi, during step-off demands for operating fluid from the tank.

For the indicated illustrative application of the invention, it was proposed to employ a motor-driven ball-screw system to develop requisite axial displacement for the valve member, with a lead of helical ball-screw advance in the order of 0.005 inch/revolution. But this was not possible, because the smallest ball screw available to carry the involved 10,000 psi unbalanced load has a lead of 1-mm/rev. (0.0394 inch/rev.). Thus, a single ball-screw design would place excessive torque and mass requirements on the motor, totally inconsistent with a design objective of minimizing bulk of the valve system.

In the present description, for convenience of reference, the central axis of the valve system will be sometimes referred to as "vertical", thus justifying use of the words "upper" and "lower" in connection with various component parts. But it will be understood that a "vertical" orientation is not necessary for operation of the invention, in that valve operation is not in any sense dependent upon any relation to the instantaneous gravity vector.

BRIEF STATEMENT OF THE INVENTION

It is an object of the invention to provide an improved valve and valve-operating mechanism of the character indicated.

A specific object is to meet the above object with a construction of minimum size and mass, and with the capacity to smoothly regulate relatively great pressure reduction from elevated upstream supply pressures.

Another specific object is to meet the above objects with a construction and mode of operation that lend themselves to miniaturization, including full containment of electronics for control of valve-member position and displacement.

The invention meets the above objects and provides further novel features, in a valve construction wherein the rotor shaft of a reversible electric motor is axially displaceable between axially spaced elements of a differential-screw system for driven displacement of a valve member. Each of these spaced elements is preferably a ball screw, independently co-operative with upper and lower regions of the rotor shaft, i.e., at the respective upper and lower sides of the rotor carried by the shaft. The valve of the invention and its control and drive system are contained within a housing which fixedly mounts (a) the ball-screw nut of the upper element of the differential-screw system and (b) the stator of the motor, so that motor-driven rotation results in axial displacement of the rotor and its shaft, pursuant to the helical advance lead or pitch of the upper ball-screw nut. The ball-screw nut of the lower element of the differential-screw system is (a) engaged to the shaft and (b) axially displaceable yet effectively keyed against rotation with respect to the housing; and this lower ball-screw nut is adapted to provide axial displacement control of a poppet-valve member with respect to its coacting seat, in a valve-body passage between inlet and outlet ports of the valve. Great mechanical advantage is achieved for relatively low motor-torque delivery, when the helical leads (or pitches) of the respective ball screws are in the same direction but are slightly different.

DETAILED DESCRIPTION

The invention will be described in detail for a preferred embodiment, in conjunction with the accompanying drawings, in which:

FIG. 1A is fragmentary detail as to keyed rotor parts, taken in the section plane 1A—1A of FIG. 1;

Figure 1:
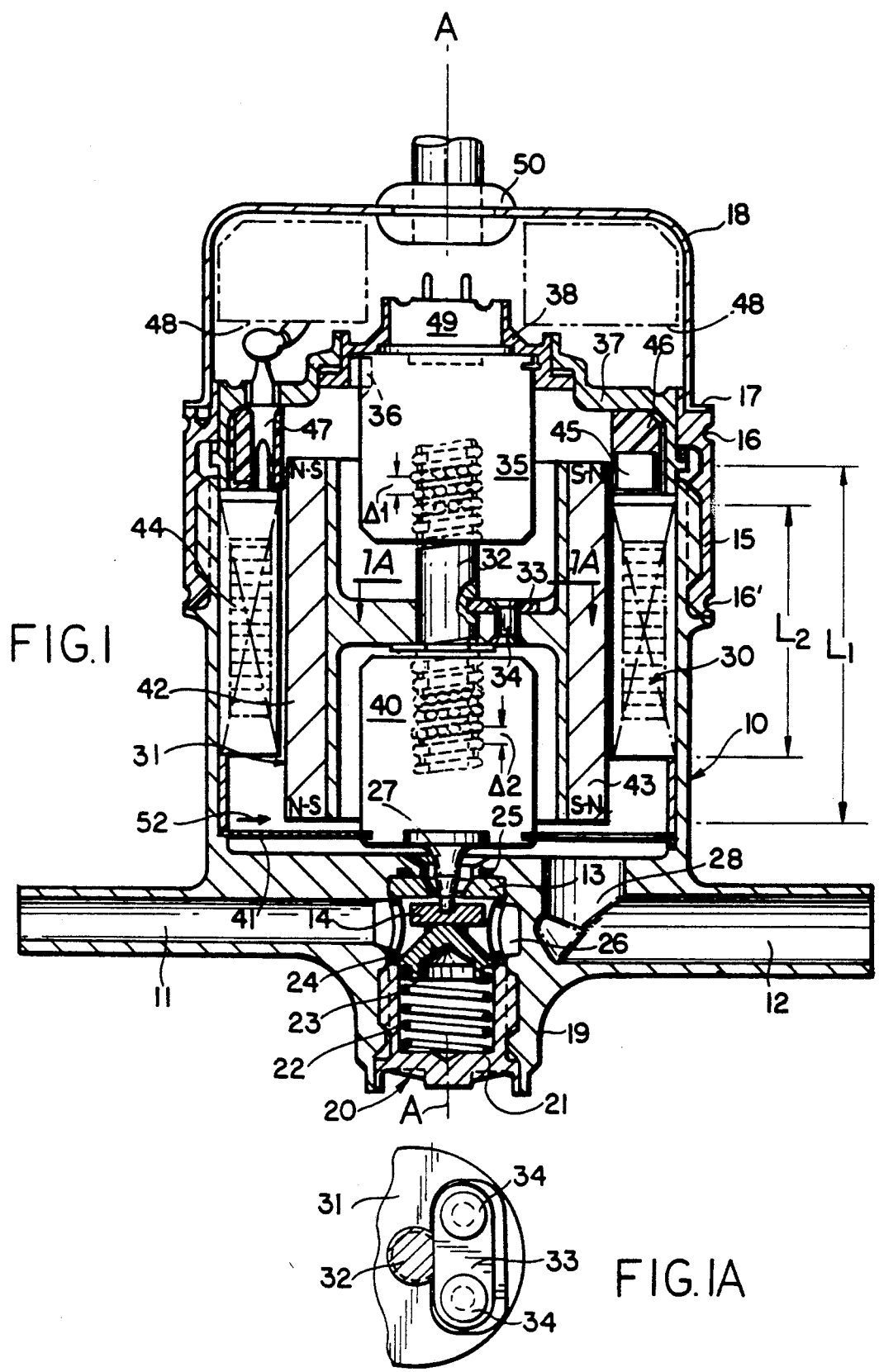
FIG. 1 is a view of a valve of the invention, in a longitudinal section which includes the central axis of the valve, the valve being shown in an "open" condition.

Referring initially to FIG. 1, a valve of the invention is seen to be contained within a sealed housing or container comprising a generally cylindrical body 10 having a closed lower end formed for definition of an inlet port and passage 11 and an outlet passage and port 12. A central opening in the otherwise closed lower end is cylindrically counterbored to mount an annular valve-seat member 13 on the central vertical axis A—A of the valve and to freely accommodate the volume displaced by axial motion of a poppet-valve member 14 between its upper limit of valve-closing engagement with seat 13 (see FIG. 2) and its lower limit of valve-open positioning, which lower limit may be slightly beyond the partially open valve-member position shown in FIG. 1. A reinforcing collar 15 having sealed and threaded engagement to the open upper end of body 10 provides a rugged means of mounting the valve to support structure (not shown), by way of axially spaced and circumferentially extending locating grooves 16, 16'. Collar 15 is formed with an upper radial shoulder for removably sealed and located assembly to the lip flange 17 of an upper-end closure cup 18.

As shown, the lower end of body 10 has a central downwardly projecting formation 19 which has a threaded bore for removable assembly of a spring-loading subassembly 20 thereto. This subassembly 20 comprises an upwardly open cup 21 with externally threaded engagement to the bore of formation 19. Cup 21 has a cylindrical bore for the containment of a coil spring 22 which centrally locates a flanged conical cap 23 for continuous application of axial preloading force against the central underside of the poppet-valve member 14. An annular sleeve 24 is also located in the counterbore for seat member 13, sleeve 24 being driven by threaded advance of cup 21 into seat-member (13) engagement with the upper end of the counterbore and compression of an elastomeric O-ring seal 25. The inlet passage 11 communicates with an annular manifold formation 26 concentric with the axis A-A, and a plurality of angularly spaced openings in sleeve 24 freely admit inlet fluid flow to an annular orifice defined within seat member 13, whenever valve member 14 is downwardly driven to a valve-open condition, via an actuator pin or stem 27, as will become clear. Pressure fluid which traverses the valving orifice defined by and between elements 13, 14 and 27 is free-flooding of components within housing 10, and is discharged via an off-axis passage 28 through the lower-end closure of the housing, with communication direct to the outlet passage or port 12.

As indicated generally above, valve-member actuation is electric-motor driven, involving stator-winding means 30 fixedly mounted to the inner wall of the housing body 10 and a rotor 31 key-mounted to a shaft 32 which is suspended by upper and lower threaded engagements of differing thread pitch, the upper threaded engagement being fixedly referenced to the housing body 10, and the lower threaded engagement being retained against rotation with respect to the housing while also axially yieldably supported for axially positioning thrust delivery (via actuator stem 27) to valve member 14. This thrust delivery is against the opposing preload force of spring 22 in the direction of seating the valve member 14. The key for mounting rotor 31 to shaft 32 is seen in FIG. 1A to comprise a key plate 33 secured at 34 to a web portion of the rotor at a locally milled chordal key slot in shaft 32.

More specifically, the upper threaded engagement is schematically shown as a first ball-screw system having a ball-screw nut 35 keyed at 36 in its mounting to nested upper-end supporting ring members 37, 38 that are rigidly secured to housing 10 and its mounting collar 15. The ball-screw nut 35 and the helically grooved upper end of shaft 32 define a ball race having a first pitch $\Delta_1$ of helical advance for each full 360° turn of shaft 32 rotation, resulting in incremental axial displacement of rotor 31, to the extent of $\Delta_1$ per turn.

Similarly, but not identically, a second and lower threaded engagement is schematically shown as a second ball-screw system having a ball-screw nut 40 keyed by means 41 against rotation with respect to housing 10. The keying means 41 is axially compliant, being suitably a radially slotted annulus of stamped sheet metal; the keying means 41 additionally provides coaxially stabilized maintenance of rotatable components, including the lower end of shaft 31, via its ball-race relation within the ball-screw nut 40. The ball-race relation between nut 40 and the helically grooved lower end of shaft 32 is characterized by a second pitch $\Delta_2$ of helical advance per turn of the rotor shaft. This pitch $\Delta_2$ is in the same direction of thread advance as is the pitch $\Delta_1$ but it differs slightly in magnitude. The net result therefore, per 360° turn of rotor 31, is an axial displacement of the lower ball-screw nut 40 to the extent $\Delta_1 - \Delta_2$, which may be net upward or net downward, depending upon the direction of rotor rotation. This net axial displacement translates into valve-member displacement by reason of the mounting of actuator stem 27 to the lower end of the lower ball-screw nut 40.

The motor shown for reversibly driving the rotor 31 and, therefore, for reversibly axially positioning valve member 14 pursuant to the described differential-screw system is of brushless d-c variety. Specifically, rotor action relies on four permanently polarized magnet elements, two (42, 43) of which are identifiable in FIGS. 1 and 2. These four elements are like elongate arcuate segments of a common geometric annulus, angularly centered at equal spacing. All four magnets are radially polarized, as suggested by legends S-N in the radially-outward direction in FIGS. 1 and 2. The other two magnets are not shown but will be centered on a vertical plane normal to the plane of FIGS. 1 and 2 and containing the axis A—A; these other two magnets will be understood to be oppositely polarized with respect to magnets 42, 43, namely, in the radially inward S-N direction. To avoid loss or inefficiency due inter alia to end effects, the axial extent $L_1$ of all rotor magnets should exceed, i.e., overlap and extend beyond, upper and lower limits of the axial length $L_2$ of the stator 30. Stator 30 will be understood illustratively to comprise a consolidated stack 44 of flat annular core laminations, toroidally enveloped with three windings, the same being schematically shown in FIG. 4 as separate phases, A, B, C, Y-connected for three-phase excitation. Finally, for phase excitation and control, a Hall-effect device (HED) 45 mounted at the upper end of the stator will be understood to be one of three HED's at equal angular spacing over an arc which is sufficient to assure HED response to two adjacent rotor magnets at any instant of time; thus, for stator magnets of near-90° width, an angular spread of 60° between adjacent HED's (meaning a total angular spread of 120° for all three HED's) will provide the indicated relationship.

Since internal components within the valve housing are continuously exposed to the pressure fluid handled by the valve, it is preferred to protect these internal components, as by plastic potting of the wound stator and all HED's into a single cylindrically annular block, only the upper end portion 46 of which is shown sectioned for potting plastic. This single potted block preferably locally includes a multiple-contact receptacle, suggested at 47, for plugged completion of electrical signal circuitry.

Description of FIG. 1 is completed by identifying an annulus 48 accommodated within the top-closure cap for potted containment of all necessary control and excitation electronics serving valve operation, with plug-in removable connection (47) to the indicated potting of the windings of stator 30. In the event, as here, that the valve is to be used as a regulator of inlet/outlet pressure reduction, a pressure-sensing transducer 49 is carried at the upper end of the motor assembly within housing 10, convenient for electrical-output connection to the potted circuitry at 48, it being recalled that fluid pressure downstream from valve elements 13, 14 is at all times exposed to the pressure transducer, along with all other contents of the valve housing. If, on the other hand, valve elements 13, 14 and the contents of housing 10 were to be operated as a relief valve, the only necessary mechanical change would be to connect passage 12 as an inlet port, and passage 11 as the outlet for relief pressure discharge, because in such a reversed situation the pressure transducer 49 would be sensing upstream pressure of the inlet passage 12. In either event, an elastomeric grommet 50 and sealed cable-connection means 51 through a central aperture in cap 18 provide external access to power-supply, set-point and other external means as may be necessary for operation of the described valve, alone or in conjunction with other components of a total system.

Figure 2:
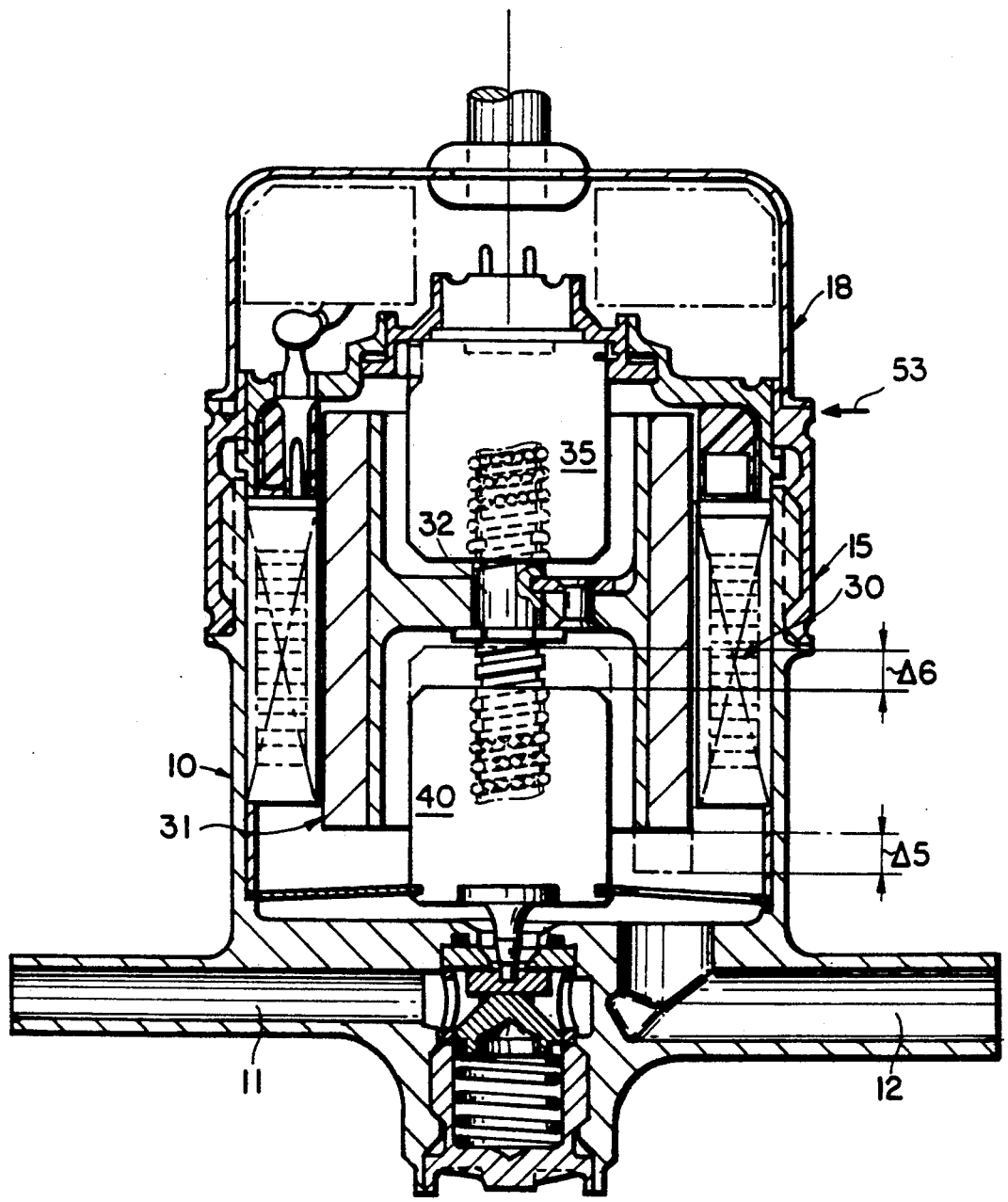
FIG. 2 is a view similar to FIG. 1, for the "closed" condition of the valve.
Figure 3:
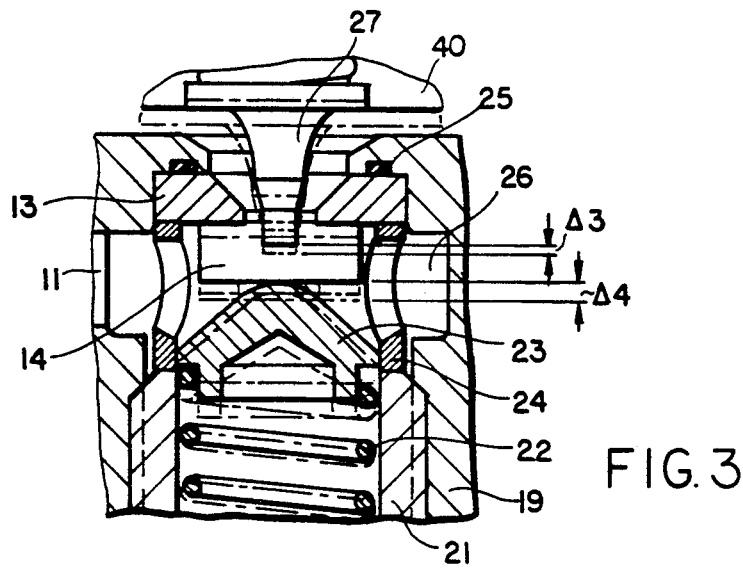
FIG. 3 is an enlarged fragmentary section to show the valve-member/valve-seat relation of parts, for the "closed" condition of FIG. 2.

FIG. 2 is virtually identical to FIG. 1 in order to show the parts relationship within housing 20, for the closed condition of the valve, wherein spring 22 is relied upon to maintain the closed condition, by reason of a small axial clearance $\Delta_3$ which has been established at the lower end of actuator stem 27, with respect to the bottom of the valve-member (14) bore which is otherwise engaged for all open conditions of the valve. In FIG. 3, the sectioning of valve member 14 has been omitted, for a clearer and exaggerated indication of the clearance $\Delta_3$ at valve closure. This clearance $\Delta_3$ will establish a small lost motion which must be taken up by axial displacement of stem 27 before it can begin in impart further axial displacement $\Delta_4$ to actuate a full opening of the valve.

FIG. 2 is further useful to identify the relatively large displacements attributable to each of the respective ball screw systems of the valve-actuating mechanism. Thus, by reason of the upper ball-screw action alone, the rotor 31 has been axially displaced to the relatively great extent $\Delta_5$, in the course of valve actuation between open and closed conditions of the valve. At the same time, the lower ball-screw nut 40 has undergone a slightly different but nevertheless relatively great displacement $\Delta_6$ with respect to shaft 32 for the same number of rotor revolutions between the fully open and fully closed conditions of the valve. And it is the difference between displacements $\Delta_5$ and $\Delta_6$ which accounts for the relatively small stem (27) displacement $(\Delta_3 + \Delta_4)$ involved in valve actuation between fully open and fully closed conditions thereof.

It has been indicated above that the described valve construction is adapted to miniaturization. As a specific example, dimensional and other numbers supplied herein for physical quantities can be taken for a construction wherein the overall vertical extent of housing 10 and its upper and lower end closures is about 2.5 inches (6.35-mm). The differential-screw action will depend upon the difference in pitch for the respective ball-screw systems, but for illustration, a specified valve-actuating displacement of 0.0050 in/rev. of the motor shaft 32 is realized by first and second ball-screw leads (at 35, 40) of 0.0444 and 0.0394 in/rev., respectively. For total valve member stroke $\Delta_4$ of 0.0148 inch from seated to full-open position, and with an overtravel allowance sufficient to provide for the valve-closed clearance $\Delta_3$ of 0.0010 inch, the lower ball-screw nut 40 and its valve-actuating stem 27 must move 0.0158 inch for their full stroke. To achieve this 0.0158-inch displacement with the differential lead of 0.0050 in/rev. dictates rotor rotation of 3.16 revolutions about axis A—A, in the course or which rotor 31 is axially displaced to the extent $\Delta_5$ of 0.1400 inch (assuming 0.004 in/rev. at 35), while the lower ball-screw nut 40 is axially displaced to the extent $\Delta_6$ of 1.1242 inch with respect to shaft 31.

The rotor 31 has positive stops for each axial limit of its travel. These take the form of permanent-magnet latches which will hold the respective limits of axial rotor (31) displacement, thus avoiding any requirement for electrical excitation to hold the valve-closed clearance $\Delta_3$. These magnet latches are merely schematically indicated by heavy arrows 52, 53 at the respective lower and upper limits of rotor 31 displacement, in FIGS. 1 and 2.

Figure 4:
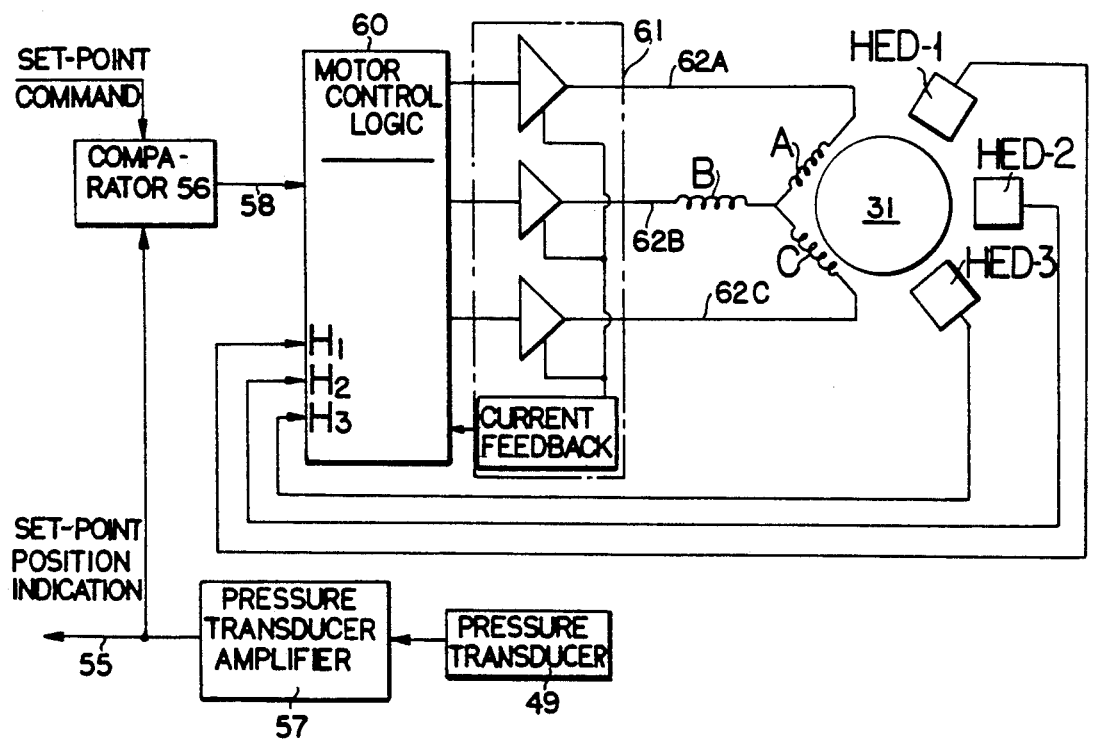
FIG. 4 is an electrical block diagram of controller components for operation of the valve of FIGS. 1 to 3 as a pressure regulator.

The controller of FIG. 4 contains circuitry to provide for establishing the pressure-regulating point of the described valve under control of a set-point command signal, as from an external system controller (not shown), as well as for monitoring and reporting the instantaneous controlled pressure via a set-point position-indication interface signal, suggested at 55.

Specifically, a comparator 56 responds continuously to the set-point command signal and to the instantaneous pressure-sensed output signal from transducer 49, shown with suitable amplifier processing at 57. The sensed difference between these signals, at the output 58 of comparator 56 is supplied to electronic-controller and driver circuitry 60, 61 for pulse-width modulated excitation of the respective motor windings via separate lines 62A, 62B, 62C, and the three HED's consolidated in the stator provide output signals to the electronic controller (at $H_1$, $H_2$, $H_3$) for use in deriving the respective pulse-width modulated signals to the motor windings. The three HED output signals will also be understood to provide a means of rotor-speed detection, for further use as velocity feedback in conjunction with motor-control logic at 60. Details of generally indicated circuitry are not provided because brushless d-c motors and pulse-width modulated control thereof are known and are not per se part of the present invention.

What is claimed is:

1. A motorized valve, comprising a housing having inlet and outlet ports, valve means within said housing for control of fluid flow between said ports, said valve means comprising a poppet-valve member displaceable along a single axis between valve-open and valve-closed positions with respect to a seat fixed to said housing; a reversible electric motor having a rotor on a shaft aligned with said axis and a stator mounted to said housing and concentric with said shaft, first threaded means coacting between said housing and said shaft with a first helical advance along said axis, and second threaded means coacting between said shaft and said poppet-valve member with a second helical advance along said axis, said first and second helical advances being in the same direction but at differing pitch, whereby to develop differential-screw action in valve-member displacement in response to electric-motor drive of said shaft.

2. The valve of claim 1, in which each of said threaded means is a ball screw.

3. The valve of claim 2, in which each ball screw includes a ball-screw nut, the ball-screw nut of said first threaded means being secured with respect to said housing, the ball-screw nut of said second threaded means being axially displaceable with respect to said housing, and anti-rotation means coacting between said housing and the ball-screw nut of said second threaded means.

4. The valve of claim 3, in which said anti-rotation means is an axially compliant annular flexure member having an outer periphery connected to said housing and an inner periphery connected to the ball-screw nut of said second threaded means.

5. The valve of claim 4, in which said inner and outer peripheries are circumferentially continuous, and in which said flexure member in unstressed condition is flat and characterized by a uniformly spaced plurality of generally radial leg formations integrally connecting said inner and outer peripheries.

6. The valve of claim 1, in which said electric motor is of brushless d-c variety.

7. The valve of claim 1, in which control means for said electric motor includes means for establishing upper and lower limits of longitudinal displaceability of said rotor, said rotor so exceeding the effective axial extent of said stator as to overlap beyond the effective axial extent of said stator for rotor displacements to and between said upper and lower limits.

8. The valve of claim 1, in which said poppet-valve member is a disc coacting with a circumferentially continuous seat in the valve-closed position, spring means preloaded in compression and reacting against a part of said housing for continuously urging said poppet-valve member in the valve-closing direction.

9. The valve of claim 8, in which the coaction between said second threaded means and said poppet-valve member comprises an axially telescoping engagement between coaxially central formations, whereby said second threaded means continuously assures axially central location of said poppet-valve member.

10. The valve of claim 9, in which said coaxially central formations comprise a cylindrical-rod formation having axially telescoping slidable engagement within a cylindrical-bore formation of limited axial depth which does not exceed the axial length of said cylindrical-rod formation, whereby both said threaded means are motor-driven to determine poppet-valve member positions displaced from the valve-closed position, and latch means operative to shut off electric-motor excitation for a valve-closed relationship wherein said cylindrical-rod formation has established a clearance relation with the limited depth of said cylindrical-bore formation, whereby said spring means is the sole means of retaining the valve-closed position.

11. The valve of claim 10, in which said latch means includes a permanent magnet whereby to positively retain the valve-closed position in the absence of excitation of said electric motor.

12. A motorized valve, comprising a housing having inlet and outlet ports, valve means within said housing for control of fluid flow between said ports, said valve means comprising a poppet-valve member displaceable along a single axis between valve-open and valve-closed positions with respect to a seat fixed to said housing; a reversible electric motor having a rotor on a shaft aligned with said axis and a stator mounted to said housing and concentric with said shaft, first ball-screw means including a first ball-screw nut fixed to said housing and establishing a first relation of helical advance for axial displacement of said shaft in response to shaft rotation, and second ball-screw means including a second ball-screw nut guided for displacement along said axis and having an effectively keyed relation against rotation with respect to said housing, said second ball-screw nut coacting with said poppet-valve member and establishing a second relation of helical advance for axial displacement of said second ball-screw nut and of said poppet-valve member in response to shaft rotation, said first and second helical advances being in the same direction but at differing pitch, whereby to develop differential-screw action in valve-member displacement in response to electric-motor drive of said shaft.

13. The valve of claim 12, in which said seat and said poppet-valve member divide flow between said ports into an upstream side and a downstream side, and in which said housing is a sealed container of the downstream side of said valve means, a pressure transducer mounted within said container for producing an electrical-signal output in response to instantaneously sensed pressure within said container, and electrical control means including means for establishing a set point of downstream-regulated pressure and including a connection to said transducer for reversibly driving said electric motor as needed to maintain the set point of regulated downstream pressure.

14. The valve of claim 12, in which said housing is a sealed container of said valve means, said housing comprising an upwardly open generally cylindrical body concentric with said single axis, said body containing said valve means and having a lower-end closure which includes said ports and said seat and said poppet-valve member, and said housing further comprising a second end closure removably sealed to the upwardly open end of the cylindrical body and containing electrical-control means for said motor, with a sealed port connection for external supply of valve-operating electric power.

15. The valve of claim 12, in which said electric motor is a brushless d-c motor, wherein said stator comprises three windings in angularly spaced relation about the central axis, and in which said rotor comprises four elongate permanent magnets in angularly spaced relation, said permanent magnets being radially polarized in successively reversed radially inward and radially outward directions of polarity from one magnet to the next-adjacent magnet in angularly spaced succession.

* * * * *